United States Patent [19]

Saito

[11] Patent Number: 4,825,311

[45] Date of Patent: Apr. 25, 1989

[54] MAGNETIC REPRODUCING APPARATUS WITH HEAD POSITIONING CIRCUIT

[75] Inventor: Isao Saito, Kawasaki, Japan

[73] Assignee: Sony Corporation, Tokyo, Japan

[21] Appl. No.: 385,934

[22] Filed: Jun. 7, 1982

[30] Foreign Application Priority Data

Jun. 9, 1981 [JP] Japan .................................. 56-88367

[51] Int. Cl.⁴ ........................ G11B 5/592; G11B 21/10
[52] U.S. Cl. .................................... 360/77.16; 360/70; 360/10.2
[58] Field of Search ...................... 360/9.1, 10.1, 10.2, 360/10.3, 11.1, 70, 75, 77, 78

[56] References Cited

U.S. PATENT DOCUMENTS 4,356,522 10/1982 Takano et al. ......................... 360/77
4,370,685 1/1983 Hosoi et al. ............................ 360/77

FOREIGN PATENT DOCUMENTS 0067562 12/1982 European Pat. Off. ............. 360/109
2071873 9/1981 United Kingdom .................. 360/70

Primary Examiner—Alan Faber
Assistant Examiner—David L. Robertson
Attorney, Agent, or Firm—Lewis H. Eslinger; Jay H. Maioli

[57] ABSTRACT

A magnetic reproducing apparatus comprises two rotary magnetic heads mounted on respective bimorphs, the heads being displaceable in the transverse direction relative to recorded tracks on a magnetic tape is response to control voltages applied to the respective bimorphs to effect correct scanning of the tracks, a pulse generator for generating a first pulse signal of frequency dependent on the transport speed of the tape, a first counter for counting the pulses of the first pulse signal to produce a first count output each time a head completes scanning of a track, a second counter which, starting from the first count output, counts the pulses of a second pulse signal which has a frequency which is an integral multiple of the frequency of the first pulse signal and produces a second count output, and a circuit to derive from the second count output control voltages for supply to the bimorphs to preset the positions of the heads relative to the tracks each time a head is to start scanning a track. The apparatus further comprises a third counter for counting the pulses of the first pulse signal to produce a respective third count output corresponding to each scan of a track by a head, a subtractor to derive a difference output from each third count output and the immediately preceding third count output, and an adder to add the difference output to the second count output prior to supply to the circuit for deriving the control voltage, whereby the control voltages are modified in dependence on acceleration or deceleration of the transport speed of the tape.

8 Claims, 7 Drawing Sheets

FIG. 3. PRIOR ART
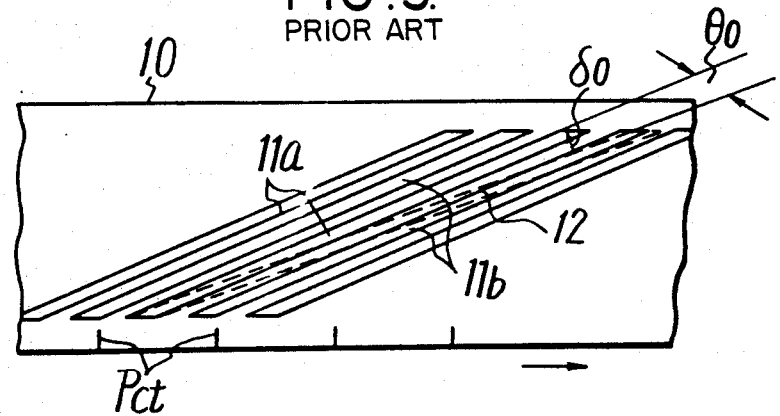
FIG. 4A. PRIOR ART
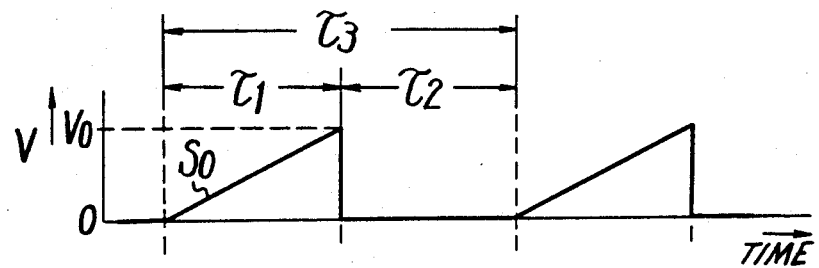
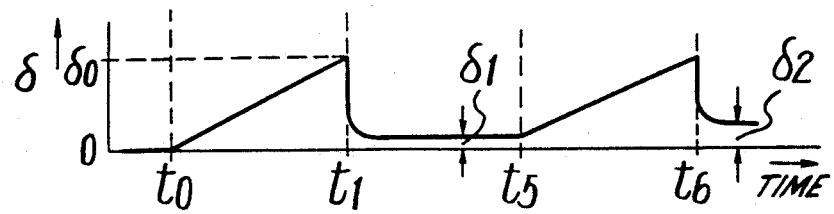
FIG. 4B. PRIOR ART

MAGNETIC REPRODUCING APPARATUS WITH HEAD POSITIONING CIRCUIT

BACKGROUND OF THE INVENTION

1. Field of the Invention

This invention relates to magnetic reproducing apparatus of the type comprising a plurality of rotary magnetic heads attached by electromechanical transducers to a rotary drum.

2. Description of the Prior Art

In a magnetic recording/reproducing apparatus such as a video tape recorder (VTR), a plurality, for example, two rotary magnetic heads are generally attached to a rotary drum or rotary disc so as to be spaced at equal angular distances (in this case 180°). The heads record signals alternately on a magnetic tape or reproduce the signals alternately from the magnetic tape in association with the rotation of the rotary drum.

For reproduction, in order to make the heads trace (or scan) the recorded tracks precisely, it is usual for the heads to be attached to the rotary drum by way of electromechanical transducer elements such as bimorph leaves. By applying suitable driving signals to electrodes which are coated on the major surfaces of the bimorphs, the bimorphs can be displaced thereby to cause the heads accurately to trace the recorded tracks.

There is, however, a problem with such an arrangement, and this is difficulty in deriving a driving signal to be applied to the electrodes of a bimorph at the time when the head mounted on that bimorph is to start to trace a recorded track.

SUMMARY OF THE INVENTION

One object of the present invention is to provide a magnetic reproducing apparatus having provision for presetting the position of a reproducing head before it starts to scan a recorded track.

Another object of the present invention is to provide a magnetic reproducing apparatus having provision for presetting the position of a reproducing head in dependence on changes in transport speed of a tape and before the head starts to scan a recorded track on the tape.

According to the present invention there is provided a magnetic reproducing apparatus comprising:

a plurality of rotary magnetic heads mounted on respective electromechanical transducer elements, said magnetic heads being displaceable in the transverse direction relative to recorded tracks on a magnetic tape in response to control voltages applied to the respective said transducer elements to effect correct scanning of said tracks;

a pulse generator for generating a first pulse signal of frequency dependent on the transport speed of said tape;

a first counter for counting the pulses of said first pulse signal to produce a first count output each time a said head completes scanning of a said track;

a second counter which, starting from said first count output, counts the pulses of a second pulse signal which has a frequency which is an integral multiple of said frequency of said first pulse signal and produces a second count output; and means to derive from said second count output control voltages for supply to said transducer elements to preset the positions of said heads relative to said tracks each time a said head is to start scanning a said track; and wherein the apparatus further comprises:

a third counter for counting the pulses of said first pulse signal to produce a respective third count output corresponding to each scan of a said track by a said head;

means to derive a difference output from each said third count output and the immediately preceding said third count output; and means to combine said difference output with said second count output prior to supply to said means for deriving said control voltage, whereby said control voltages are modified in dependence on changes in said transport speed.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 is a view of a magnetic tape showing a recorded pattern thereon;

FIGS. 4A and 4B, FIGS. 6, 8, and 9 are waveform diagrams for explaining previously proposed apparatus and the embodiment;

DESCRIPTION OF THE PREFERRED EMBODIMENTS

To assist understanding of the invention some previously proposed apparatus will first be described, initially with reference to FIGS. 1 to 4.

Figure 1:
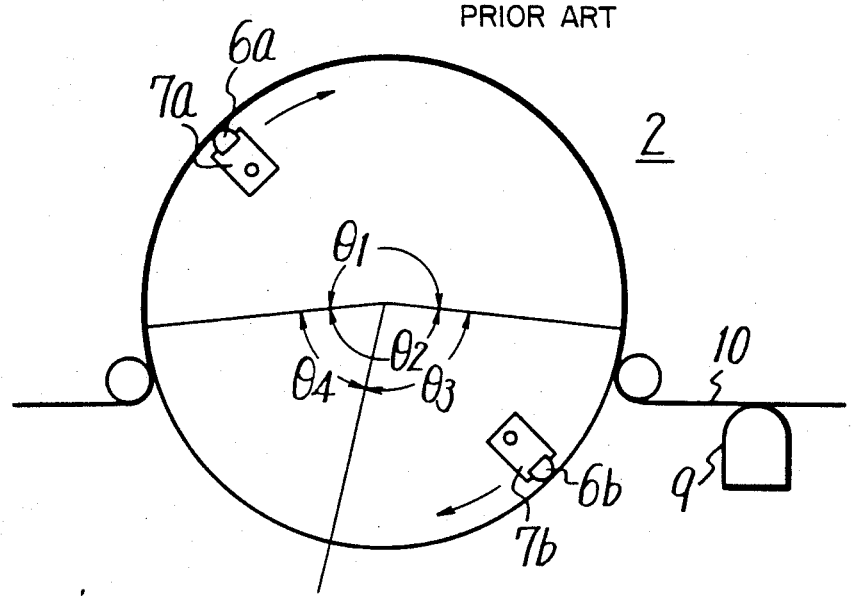
FIG. 1 is a schematic plan view of a rotary drum used to explain a magnetic reproducing apparatus.
Figure 2:
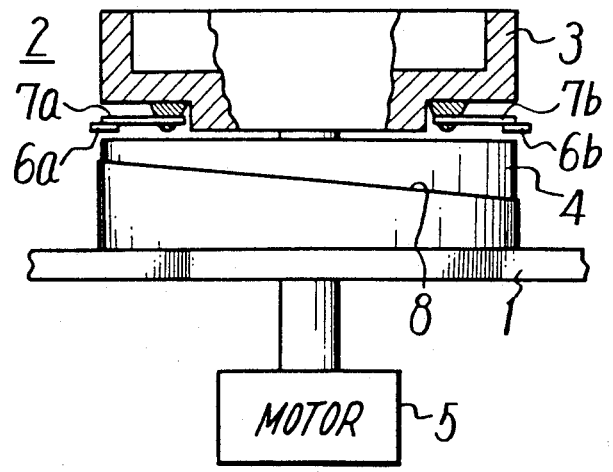
FIG. 2 is a side view of the rotary drum with a cut away.

A VTR includes a base plate 1 and a rotary magnetic head apparatus 2 comprising a rotary drum arrangement formed by an upper drum 3, a lower drum 4 and a motor 5. In this example, the lower drum 4 is secured on the base plate 1 and only the upper drum 3 is rotated. A pair of rotary magnetic heads 6a and 6b are attached to the upper drum 3 by way of bimorphs 7a and 7b, respectively. The angular distance between the heads 6a and 6b is selected to be 180°. There is also a tape guide 8 attached to or formed on the lower drum 4, a control (CTL) pulse magnetic head 9, and a magnetic tape 10 which is transported while being wrapped around the rotary magnetic head apparatus 2 over an angular range slightly larger than 180°. Accordingly, as shown in FIG. 1, an angle $\theta_1$ represents an interval where the heads 6a and 6b contact the magnetic tape 10, while an angle $\theta_2$ represents an interval where they do not contact the tape 10.

FIG. 3 shows recorded tracks on the magnetic tape 10, and in which tracks 11a are recorded by the head 6a and tracks 11b are recorded by the head 6b. CTL pulses Pct are also shown.

In the playback mode, the extent of the deviation of the heads 6a and 6b from the tracks 11a and 11b is detected, and driving signals corresponding to the amount of the deviation are supplied to the bimorphs 7a and 7b so as to vary the heights of the heads 6a and 6b, not only when reproducing in normal modes, but also when reproducing in special modes such as at non-normal speeds. In this way the heads 6a and 6b can trace the recorded tracks 11a and 11b substantially accurately, thus providing a reproduced picture image which generally contains no guard band noise.

The driving signals suplied to the bimorphs 7a and 7b are initially set in dependence on the transport speed of the tape 10 and an information signal derived from the CTL pulses Pct. Also, during the playback of the signal from the recorded track 11a or 11b by the head 6a or 6b, the value of the driving signal supplied to the bimorph 7a or 7b is controlled in dependence on a feedback signal derived by a closed loop circuit. However, in the intervals when the head 6a or 6b is not in contact with the tape 10, the driving signal is controlled only by the information signal from the closed loop circuit and in consequence the initial position at which the head 6a or 6b traces either the track 11a or 11b may have a substantial error.

This problem will now be further described for the case of the still playback mode in which the heads 6a and 6b trace loci 12 such as shown by dotted lines in FIG. 3, and hence they have an error denoted by an angle $\theta_0$ relative to the tracks 11a and 11b, thus resulting in the guard band noise.

In this case, considering only the head 6a, as illustrated in FIG. 4A, a ramp signal $S_0$ is supplied to the bimorph 7a so as to vary the height of the head 6a with time, and by repeating this operation in each angular interval $\theta_1$ in which the head 6a contacts the tape 10, it is possible to cause the head 6a to trace the track 11a or 11b precisely. In FIGS. 4A and 4B, time is indicated along the abscissa. In FIG. 4A, a voltage V of the driving signal for driving the bimorph 7a is indicated on the ordinate, while in FIG. 4B, there is indicated a displacement $\delta$ of the free end of the bimorph 7a (more precisely, the displacement in the height of the head 6a) on the ordinate. Reference $V_0$ corresponds to a displacement $\delta_0$ denoted by an arrow in FIG. 3. In FIGS. 4A and 4B, references $\tau_1$ and $\tau_2$ respectively represent one field period, $\tau_1$ indicating the playback period of the head 6a and $\tau_2$ the fly-back period of the same head 6a or the playback period of the head 6b. Finally, $\tau_3$ ($=\tau_1+\tau_2$) indicates one rotational period of the rotary magnetic head apparatus 2. In this case, the head 6b operates in the same manner as described above, with a period delayed by one field.

While the above description dealt with the case of the still playback mode, in other cases of non-normal tape speed such as in a slow playback mode, the ramp signal $S_0$ responsive to the tape transport speed is likewise supplied to the bimorphs 7a and 7b, respectively. Taking the slow playback mode as an example, although as described above, by supplying the ramp signal $S_0$ to the bimorph 7a or 7b, it becomes possible to make the head 6a or 6b trace the track 11a or 11b precisely, there is no way to avoid the mistracking caused at the time point where each head 6a or 6b starts to trace each track 11a or 11b.

Figure 6:
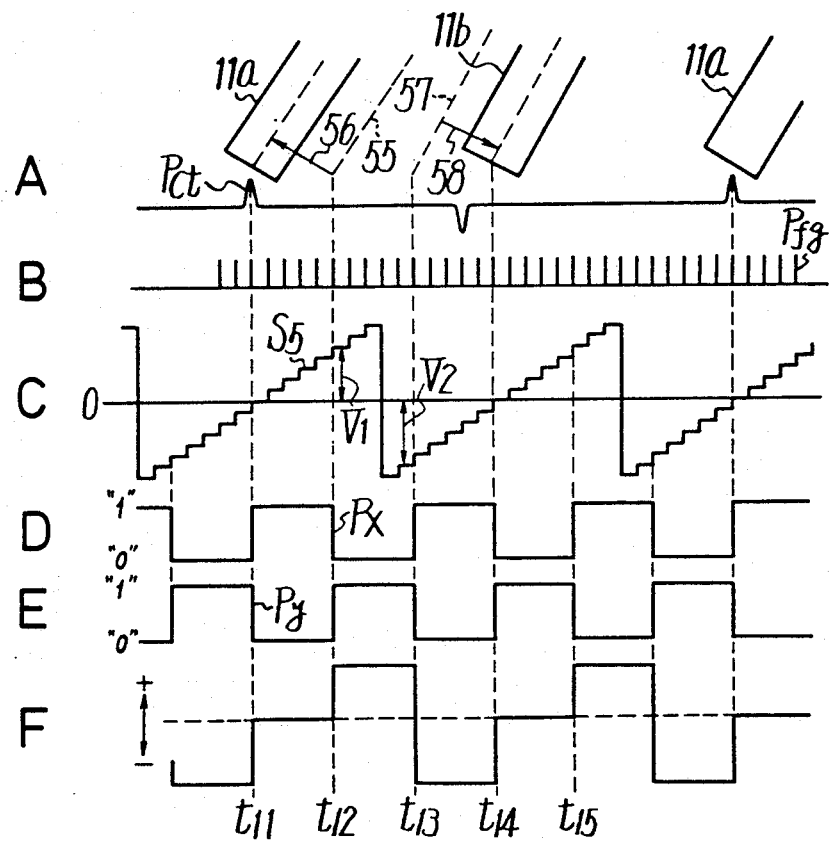

Now, let us describe with reference to FIG. 6 the slow playback mode in which the tape transport speed is ⅓ that of the normal playback mode. FIG. 6 line A shows the tracks 11a and 11b, and the CTL pulses Pct. FIG. 6, lines D and E show waveforms of switching pulses formed of a pulse signal (which is generally produced by a pulse generator) corresponding to the rotation of the upper drum 3, in which during the period where a pulse Px is high level "1", the head 6a produces the reproduced signal, and during the period where a pulse Py is high level "1", the head 6b produces the reproduced signal. Then, although during the time period from $t_{11}$ to $t_{12}$, first of all, the head 6a traces the left-most end track 11a of FIG. 6A, during the time period from $t_{12}$ to $t_{13}$, the head 6b traces a locus 55 shown by a dotted line in FIG. 6A, during the time period from $t_{13}$ to $t_{14}$, the head 6a traces a locus 57 shown by a dotted line in line A, and during the time period from $t_{14}$ to $t_{15}$, the head 6b traces the track 11b. That is, mis-trackings occur during the time period from $t_{12}$ to $t_{13}$ and during the time period from $t_{13}$ to $t_{14}$.

To avoid this, it would be enough previously to displace the head 6b tracing the locus 55 during the time period between $t_{12}$ and $t_{13}$ in a direction and with an amount indicated by an arrow 56. Also, during the time period between $t_{13}$ and $t_{14}$, it would be enough previously to displace the head 6a tracing the locus 57 in a direction and with an amount indicated by an arrow 58.

Figure 5:
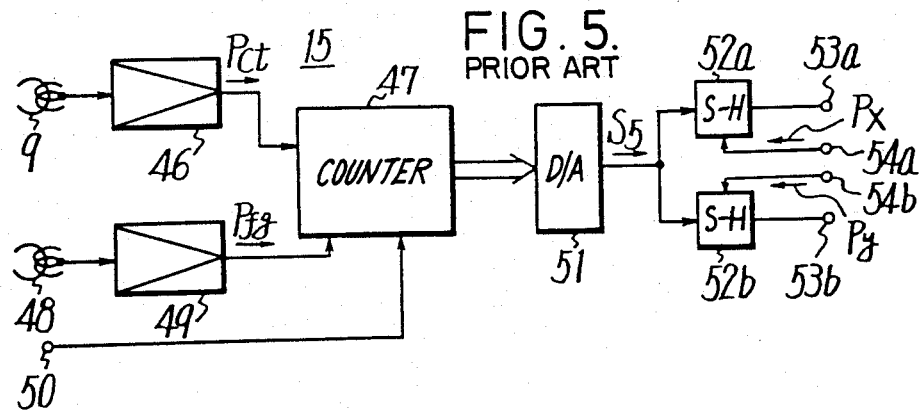
FIGS. 5 and 7 are schematic block diagrams showing respective examples of previously proposed magnetic reproducing apparatus.

To this end, we have previously proposed a prediction voltage generating circuit 15 as shown in FIG. 5. This will now be explained. The CTL pulses Pct derived by the CTL head 9 are amplified by an amplifier 46 and then supplied to a load terminal of an up-down counter 47, while a frequency generator (FG) 48 is provided at the capstan (not shown) of the VTR so as to generate a pulse signal which is supplied to and amplified by an amplifier 49, and then supplied to the clock signal input terminal of the counter 47. Accordingly, the repeating frequency of the pulse signal generated by the FG 48 corresponds to the tape speed. An addition command signal or a subtraction command signal is supplied to an input terminal 50 corresponding to the forward or reverse transportation of the tape 10. The input terminal 50 is connected to the up-down signal input terminal of the counter 47.

FIG. 6 line A shows the relation between the CTL pulses Pct and the tracks 11a and 11b, while FIG. 6 line B shows the relation between the CTL pulses Pct and FG pulses Pfg (which are pulses obtained in correspondence with the rotation of the capstan). The FG pulses Pfg not only have the repeating frequency of 900 Hz in the normal playback mode, but also have 30 pulses for each CTL pulse Pct, that is, within one frame of the video signal (for a 30 frame/sec system). The number of the pulses within one frame has nothing to do with the tape speed.

The output from the counter 47 (FIG. 5) is supplied to a digital-to-analog (D/A) converter 51 from which a staircase signal $S_5$ as shown in FIG. 6C is generated. In this case, it is assumed that in the normal playback mode, the phase of this staircase signal $S_5$ is selected in such a way that the time point at which the respective heads 6a and 6b start to trace the respective tracks 11a and 11b, for example, the time point $t_{11}$, may coincide in time with a height near the middle portion of the staircase signal $S_5$. The staircase signal $S_5$ is supplied to sample-holding circuits 52a and 52b, outputs of which are supplied respectively to the bimorphs 7a and 7b via terminals 53a and 53b. On the other hand, the sample-holding circuits 52a and 52b are respectively supplied with the switching pulses Px and Py shown in FIG. 6 line D and E through terminals 54a and 54b. As described above, this example deals with the case where the tape speed is ⅓ that is the normal playback mode. Accordingly, during one period of the CTL pulses Pct, each of the switching pulses Px and Py has the frequency of 3 Hz. During the period when the switching pulse Px is high level "1", the head 6a contacts the tape 10 and also, the sample-holding circuit 52a is held, while during the period when the pulse Py is high level "1", the head 6b contacts the tape 10 and also, the sample-holding circuit 52b is held thereby to allow the staircase signal $S_5$ to be sampled at the respective rising edges of the pulses Px and Py.

In FIG. 6, at the time point $t_{11}$ where the head 6a starts to trace the track 11a, the staircase signal $S_5$ sampled by the pulse Px is substantially at the centre of the staircase waveform. Thus, if the voltage at this position is taken as a reference voltage (for example, zero voltage) of the prediction voltage, the bimorph 7a is supplied with the prediction voltage zero, so that in this case, the bimorph 7a is not displaced at all. Therefore, at the time point $t_{11}$, the head 6a attached to the bimorph 7a begins to contact the tape 10 from the original position, so the head 6a starts to trace just the track 11a. Thereafter, the control signal $S_1$ described above is supplied to the bimorph 7a so as to permit the head 6a to trace the track 11a.

When the reproduction of the recorded signal by the head 6a is the time period from $t_{11}$ and $t_{12}$ is completed, the head 6b starts to trace the track 11b from the time point $t_{12}$. At the rising edge of the pulse Py (the time point $t_{12}$), the staircase signal $S_5$ is sampled by the sampling-holding circuit 52b, and the sample of the staircase signal $S_5$ obtained therefrom, that is, the prediction voltage is supplied to the bimorph 7b. On the basis of the polarity (for example, positive) of the staircase signal $S_5$ thus sampled, the bimorph 7b is displaced, in this case in the direction indicated by the arrow 56 in FIG. 6 line A (for example, the positive direction) and by only the amount corresponding to the magnitude $V_1$ of the staircase signal $S_5$ as seen in FIG. 6 line C. Accordingly, in this case, the head 6b traces the track 11a, and thereafter, as will be described later, for example, the control signal $S_1$ (not shown) is supplied to the bimorph 7b so as to allow the head 6b to trace the track 11a.

Next, during the time period from $t_{13}$ to $t_{14}$, the head 6a again starts to trace a track, and since the staircase signal $S_5$ sampled by the sample-holding circuit 52a becomes $-V_2$ as shown in FIG. 6 line C and the voltage $-V_2$ is supplied to the bimorph 7a, in this case, the bimorph 7a is displaced in the negative direction in accordance with the magnitude of the signal $V_2$. Thus the head 6a traces the track 11b.

At the time point $t_{14}$, the voltage sampled by the sample-holding circuit 52b becomes zero (that is, the reference voltage) and thereafter, a similar operation is repeated, so that both the bimorphs 7a and 7b for the heads 6a and 6b are supplied with the prediction voltage before starting their trace operations, thus resulting in substantially correct tracing at the beginning of each track. FIG. 6 line F shows the voltages supplied from the sample-holding circuits 52a and 52b in such a manner as to make them continuous.

In this way it is possible to obtain the prediction voltages. However, as will be apparent from FIG. 6, since these prediction voltages can be provided only immediately before the start of the tracing operations, and moreover the bimorphs 7a and 7b have rather poor response characteristics, there is still the problem that it is not possible to achieve perfect tracking at the start of the tracing operation.

Figure 7:
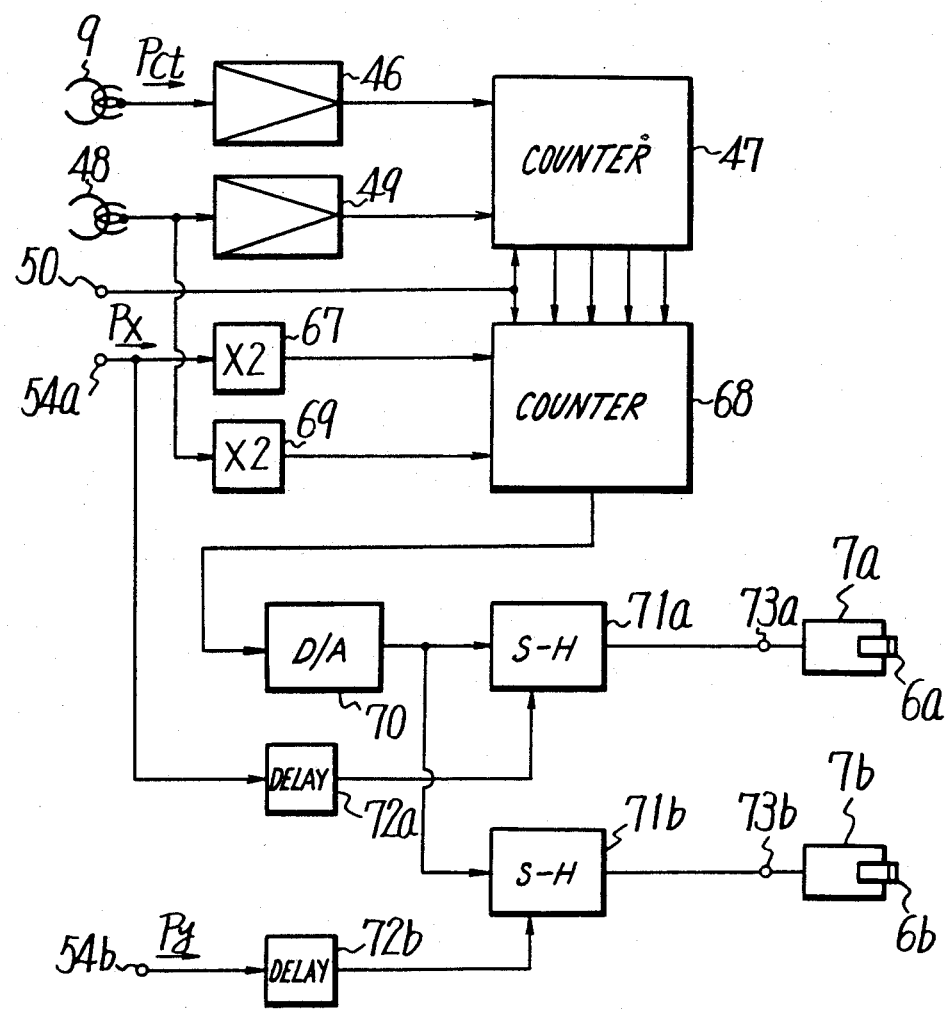

To overcome this problem, an arrangement as schematically shown in FIG. 7 has been proposed. Briefly, at the time point where a head finishes tracing the tape, the position (height) to be traced next time by that head is detected, that is, the prediction voltage is obtained and supplied to the bimorph of that head during the period when the head is not contacting the tape, whereby when the head traces the tape next time, no mistracking or at least no large mistracking will be caused at the start of the tracing operation.

The arrangement will now be described in detail with reference to FIG. 7, in which parts corresponding to like parts in FIG. 5 are marked with the same references. The CTL pulses Pct derived from the CTL head 9 are suitably amplified by the amplifier 46, and then supplied to the load terminal of the up-down counter 47 (which is used as the first up-down counter). The FG 48 is attached to the capstan (not shown) of the VTR to generate the FG pulses Pfg which are supplied to and amplified by the amplifier 49 and then supplied to the clock signal input terminal of the counter 47. In this case, the frequency of the pulse signal generated by the FG 48 corresponds to the tape speed, but this pulse signal need not necessarily be derived from the FG 48.

Figure 8:
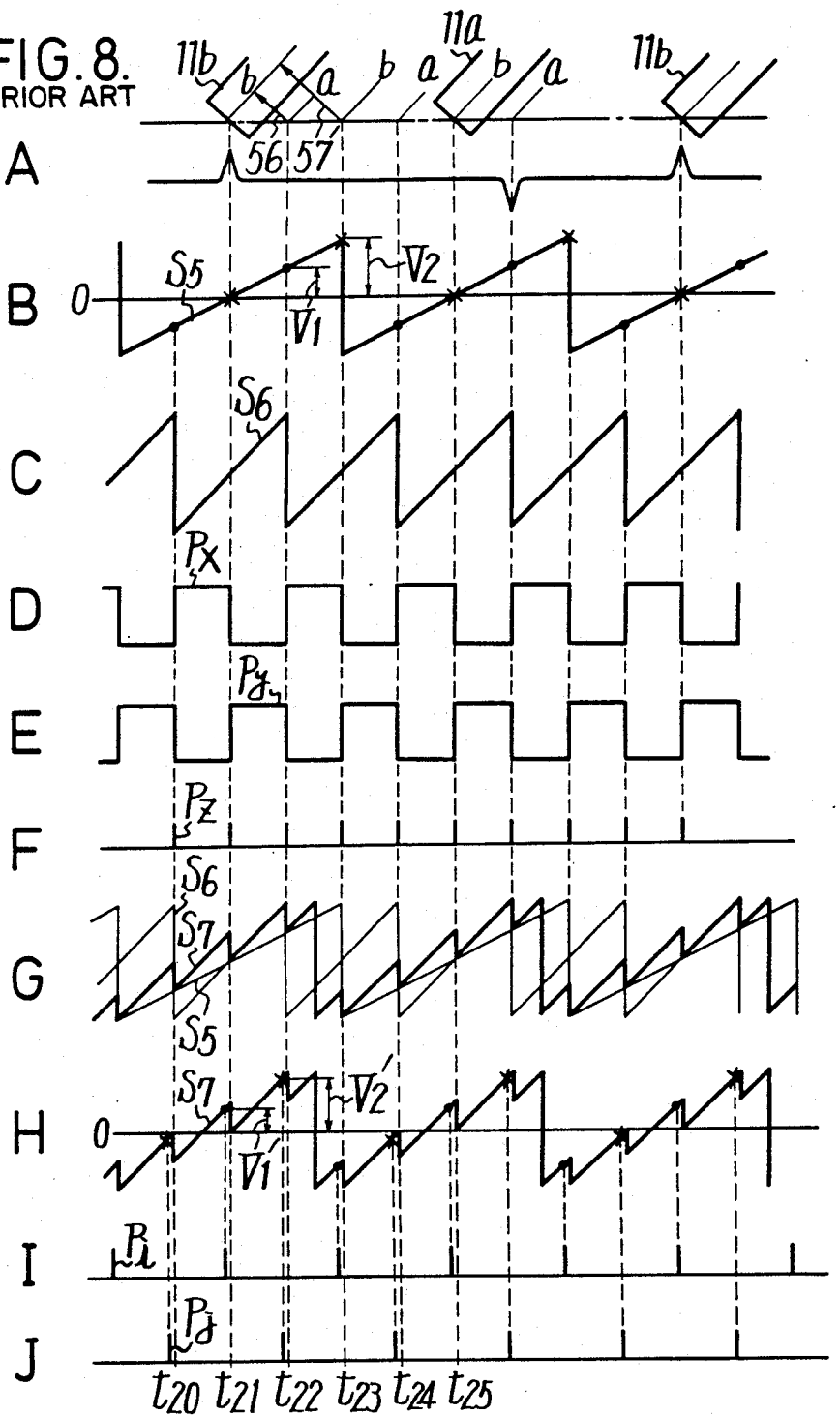

The switching pulses Px and Py (which are the same as those previously discussed in FIG. 6D or 6E and are again illustrated in FIG. 8 lines D and E) formed in depended on the rotation of the upper drum 2, each having a frequency of 30 Hz (for a 30 frame/sec system) are supplied to the input terminals 54a and 54b, whereby the pulse Px supplied to the input terminal 54a is supplied to a frequency doubling circuit 67 so as then to have frequency of 60 Hz (FIG. 8F). It is then supplied to a load terminal of a second up-down counter 68. The pulse signal supplied from the FG 48 is likewise doubled in frequency by a frequency doubling circuit 69 and is supplied to the clock terminal of the second up-down counter 68. Accordingly, when the second counter 68 is supplied with the load input, the output of the first counter 47 is fed to and memorized in the second counter 68 as the input data thereof, whereby the number of the clock pulses (the number of the pulses from the frequency double circuit 69) is counted from the calculated value stored in the second counter 68.

The output of the second counter 68 is supplied to a D/A converter 70 whose output is supplied to first and second sample-holding circuits 71a and 71b, respectively. The switching pulses Px and Py supplied at the terminals 54a and 54b, which are shown in FIG. 8 lines D and E, are supplied to first and second delay circuit 72a and 72b which produce pulses Pi and Pj respectively shown in FIG. 8 lines I and J. Thus, the pulses Pi and Pj are respectively supplied to the sample-holding circuits 71a and 71b, whereby the output from the D/A converter 70 is sampled and then held at each time point where the pulses Pi and Pj are generated. These sampled and held signals are supplied to output terminals 73a and 73b. The delay times of the delay circuits 72a and 72b are not more than one field from each rising edge of the pulses Px and Py, so, for instance, immediately before the head 6a finishes its playback operation, the sample-holding circuit 71a for the bimorph 7a of the head 6a is sampled. In the sample-holding circuits 71a and 71b, the samples are held for substantially one field.

Although in the circuit of FIG. 7, the pulse signal generated by the FG 48 is doubled in frequency by the frequency doubling circuit 69 and supplied to the second counter 68, it is also possible to arrange that the frequency of the pulse signal generated by the FG 48 coincides with the frequency of the signal to be supplied to the clock signal input terminal of the counter 68. In this case, the frequency doubling circuit 69 is not necessary and hence, the pulse signal from the FG 48 is supplied directly or, if necessary, through the amplifier 69 to the second counter 68 and the frequency of the pulse signal from the FG 48 is halved and supplied to the clock signal input terminal of the first counter 47, to bring about the same effect.

The operation will now be described with reference to FIG. 8.

The first counter 47 performs almost the same operation as described with reference to FIG. 5 and produces at its output the staircase signal $S_5$ explained with reference to FIG. 6 line C. The signal shown in FIG. 8 line B indicates the staircase signal $S_5$ but in FIG. 8 line B the staircase portion thereof is shown linear. Moreover, considering the second counter 68 only (that is, considering that the output from the first counter 47 is supposed to be zero), since this second counter 68 is reset at every switching pulse $P_z$, (FIG. 8 line F), in the above state, a ramp signal $S_6$ shown in FIG. 8 line C is provided by the second counter 68. This signal $S_6$ has such an inclination twice as steep as that of the staircase signal $S_5$ because the clock signal supplied to the counter 68 is twice the frequency.

Since the second counter 68 is supplied with the staircase signal $S_5$ from the first counter 47, and also the second counter 68 is supplied at its load terminal with the pulses $P_z$ from the frequency double circuit 67, the output (counted value) of the first counter 47 is taken as a reference and the addition is made based upon its counted value. Thus as a result, the second counter 68 produces at its output terminal a signal $S_7$ with the waveform shown in FIG. 8 line H. In this case, FIG. 8 line G illustrates the above calculation process as a waveform, in which the signals corresponding to those of FIG. 8 lines B and C are marked with the same references. This example corresponds to a case in which the tape speed is ¼ that of the normal playback mode, thus each track is traced twice by each of the heads 6a and 6b, that is, a total of four times.

In FIG. 8 line A, reference characters a and b respectively indicate the alternating positions where the respective heads 6a and 6b start to contact the tape 10 (relating to only the video track) when the points where the heads 6a and 6b start the tracing operations are not corrected by the prediction voltages generated from the circuit of FIG. 7. In FIG. 8 line A, since at the time point $t_{21}$, the head 6b traces the track 11b, it is not necessary to apply the prediction voltage to the bimorph 7b, while at time point $t_{22}$, it is necessary to displace the head 6a in a direction and by an amount as shown by the arrow 56. Moreover, at the time point $t_{23}$, the head 6b has to be displaced in the direction and with the amount shown by the arrow 57. These directions and amounts can be obtained in the manner described with reference to FIG. 6 if the central level of the staircase signal $S_5$ in FIG. 8 line B is made zero. Therefore, in the staircase signal $S_5$ of FIG. 8 line B, the positions of the head 6a corresponding to those in FIG. 8 line A are indicated by dots and those of the head 6b by crosses, respectively. By way of example, at the time point $t_{22}$, it is sufficient to supply the positive-going voltage $V_1$ to the bimorph 7a.

Next, with reference to FIG. 8 line H, it is seen that immediately before the time point $t_{21}$, the signal $S_7$ is sampled by the pulse Pi in the sample-holding circuit 71a and held over substantially one field period. It is then applied to the bimorph 7a after the time point $t_{22}$. In this case, a sampling voltage $V_1'$ has a relation with the voltage $V_1$ shown in FIG. 8 line B given by:

$V_1'$ is approximately equal to $V_1$

The signal $S_7$ is sampled by the pulse Pj (FIG. 8 line J) immediately before the time point $t_{22}$ in the sample-holding circuit 71b and this value $V_2'$ has a relation with the voltage $V_2$ shown in FIG. 8 line B given by:

$V_2'$ is approximately equal to $V_2$

As described above, with the circuit of FIG. 7, with respect to, for example, the head 6a, *by sampling the signal $S_7$* with the pulse Pi at the time point where it substantially completes its tracing operation, or with respect to the head 6b, by sampling the signal $S_7$ with the pulse Pj at the time point of substantially finishing its tracing operation, it is possible to detect each height of the heads 6a and 6b relative to the reference position at the time point each of the heads 6a and 6b will start the tracing operation next time. Since these signals thus sampled are supplied to the bimorphs 7a and 7b, on which the respective heads 6a and 6b are mounted, during the fly-back periods of the respective heads 6a and 6b, it is possible to locate the respective heads 6a and 6b at suitable positions to start the trace operations without difficulty. Thus the circuit of FIG. 7 overcomes the problems described with reference to FIG. 6.

Although the circuit of FIG. 7 operates satisfactorily as described above when the transport speed of the tape 10 is constant, in the case where the speed of the tape 10 is varied abruptly, that is, it has an acceleration in speed, a tracking error occurs resulting in generation of guard band noise.

Figure 9:
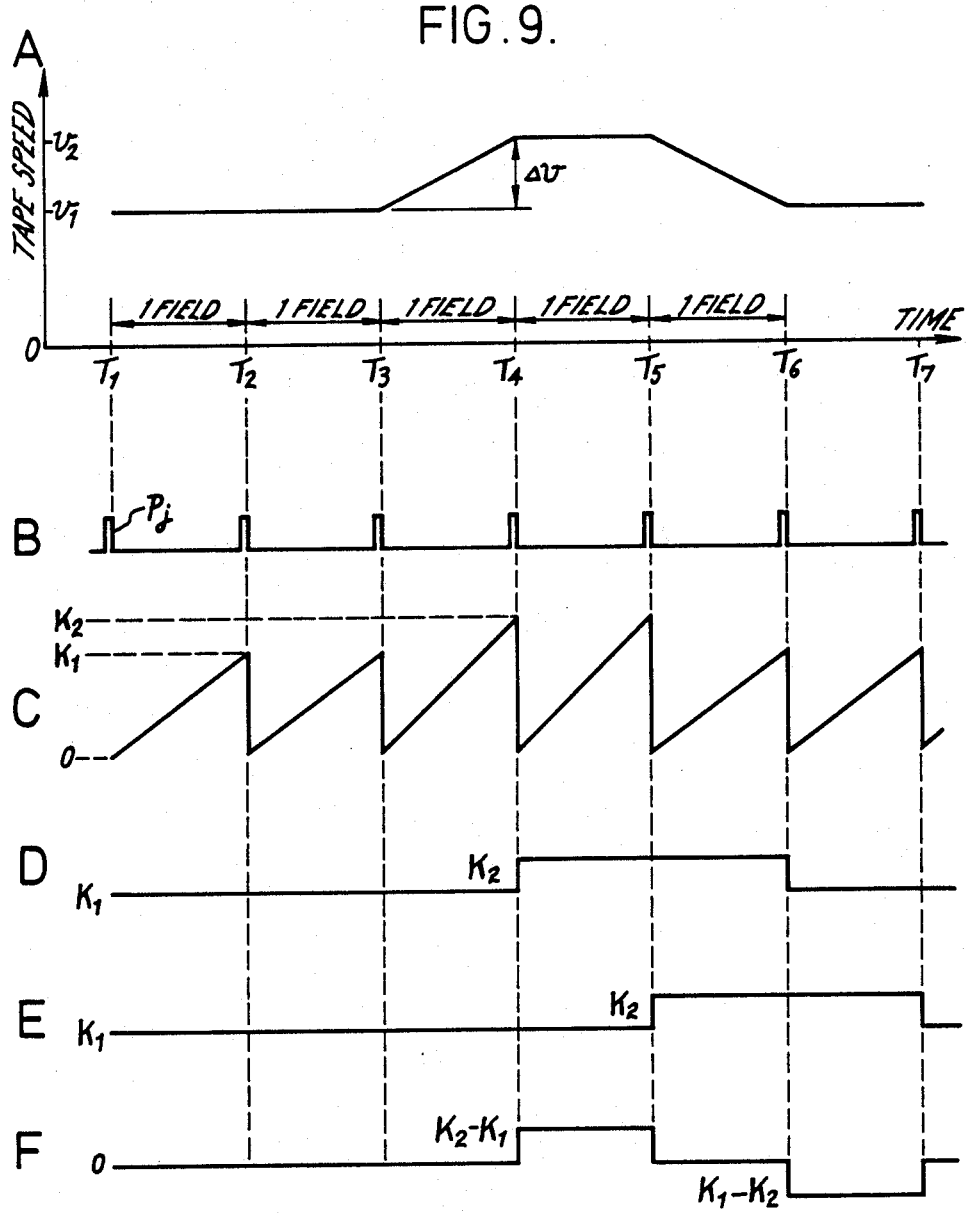

This case will be further described with reference to FIG. 9. By way of example, at time point $T_2$, let us consider what the tape speed will be at the time point $T_3$, which is one field after the time point $T_2$. The tape speed of the present field interval from the time points $T_2$ to $T_3$ is $v_1$, which is equal to the tape speed $v_1$ of the preceding one field interval from time points $T_1$ to $T_2$, so there is no error. However, at the time point $T_3$, since the tape speed of the field interval from the time points $T_3$ to $T_4$ is expected to be the same as that of the field interval from the time points $T_2$ to $T_3$ (in deriving the prediction voltage of FIG. 7, the pulse signal from the FG 48 between the time points $T_2$ and $T_3$ is utilized), a tracking error $\Delta v$ as shown in FIG. 9 will occur.

Figure 10:
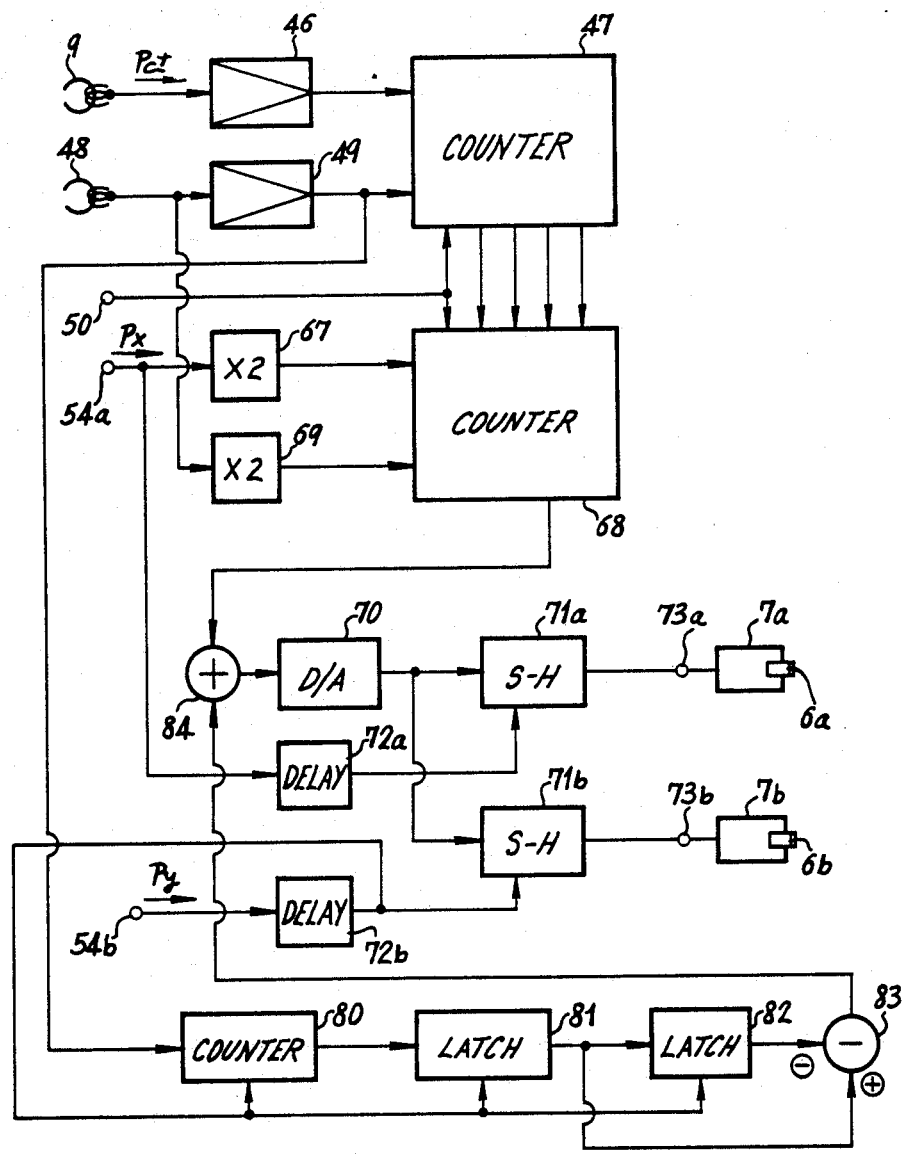
FIG. 10 is a schematic block diagram showing an embodiment of magnetic reproducing apparatus according to the invention.

Referring to FIG. 10, an embodiment of magnetic reproducing apparatus according to the invention and which can to some extent overcome this problem will be described. In FIG. 10, like references corresponding to those of FIG. 7 designate the same elements and parts, and hence they will not be explained in detail.

In the circuit of FIG. 10, the pulse signal developed at the output side of the amplifier 49 and derived from the FG 48, which is responsive to the transport speed of the tape 10, is supplied to the clock signal input terminal of an up-down counter 80. The pulse generated at each one field of the video signal, such as the pulse signal Pj produced at the output side of the delay circuit 72b is supplied to the load terminal of the counter 80. The output signal of the counter 80 is supplied to an input terminal of a first latch circuit 81, whereby each time the first latch circuit 81 is supplied with a pulse Pj of each one field as its control signal, the content of the counter 80 at that time is latched in this first latch circuit 81.

The output signal of the first latch circuit 81 is supplied to an input terminal of a second latch circuit 82, whereby each time the second latch circuit 82 is supplied with a pulse Pj of each one field as its control signal, the content of the first latch circuit 81 at that time is latched in the second latch circuit 82. Accordingly, the first latch circuit 81 latches the count signal responsive to the tape speed at the present field, while the second latch circuit 82 latches the count signal responsive to the tape speed one field earlier. The output signal of the first latch circuit 81 is also supplied to a plus terminal of a subtractor 83 and the output signal of the second latch circuit 82 is supplied to a minus terminal thereof. The subtractor 83 produces at its output a signal of a value corresponding to the output signal of the second latch circuit 82 subtracted from the output signal of the first latch circuit 81. The output signal of the subtractor 83 and the output signal of the second up-down counter 68 are respectively supplied to an adder 84, in which they are added to each other. The added output signal of the adder 84 is supplied to the D/A converter 70. Otherwise the circuit is the same as that of FIG. 7.

It is assumed that, as shown in FIG. 9 line A, the speed of the tape 10 is $v_1$ in the intervals from $T_1$ to $T_2$ and from $T_2$ to $T_3$; in the interval from $T_3$ to $T_4$ the tape speed is suddenly increased to become $v_2$; in the interval from $T_4$ to $T_5$ the tape speed remains $v_2$; in the interval from $T_5$ to $T_6$ the tape speed is abruptly decreased to become $v_1$ again; and thereafter this tape speed remains $v_1$. Also, it is assumed that the pulse Pj produced at the output side of the delay circuit 72b and appearing at each one field of the video signal is provided, as shown in FIG. 9 line B, at the time points $T_1$, $T_2$, $T_3$, . . . Accordingly, the contents counted by the up-down counter 80 are as illustrated in FIG. 9 line C. That is, in the respective field intervals from $T_1$ to $T_2$, $T_2$ to $T_3$, $T_3$ to $T_4$, $T_4$ to $T_5$, $T_5$ to $T_6$, $T_6$ to $T_7$ . . . it i gradually, at the time points $T_2$, $T_3$, $T_6$ and $T_7$, each of the counted values becomes $K_1$ and at the time points $T_4$ and $T_5$, each of the counted values becomes $K_2$ (where $K_2$ is greater than $K_1$). For this reason, the content latched by the first latch circuit 81 becomes, as shown in FIG. 9D, $K_1$ in the intervals from $T_2$ to $T_3$ and from $T_3$ to $T_4$, $K_2$ in the intervals from $T_4$ to $T_5$ and from $T_5$ to $T_6$, and $K_1$ in the interval from $T_6$ to $T_7$, . . . Moreover, the content latched by the second latch circuit 82 becomes, as shown in FIG. 9 line E, $K_1$ in the intervals from $T_3$ to $T_4$ and $T_4$ to $T_5$, and $K_2$ in the intervals from $T_5$ to $T_6$ and $T_6$ to $T_7$. Therefore, the output signal of the subtractor 83 becomes, as shown in FIG. 9 line F, $K_2-K_1$ in the interval from $T_4$ to $T_5$, $K_1-K_2$ in the interval from $T_6$ to $T_7$, and zero in other intervals. The output signal from the subtractor 83 is supplied to and added to the output signal of the second counter 68 by the adder 84, and is then supplied to the D/A converter 70. Otherwise the operation is similar to that of the circuit of FIG. 7.

Thus, as described, at the time point $T_4$ where the tape speed has increased rapidly, the error $K_2-K_1$ equivalent to the velocity difference $\Delta v$ ($v_2-v_1$) is added to the control signal, so the tracking error can be reduced by such amount. In addition, at the time point $T_6$ where the tape speed has rapidly decreased, the circuit of FIG. 10 can operate likewise. The tracking error is therefore reduced, so that a satisfactory reproduced picture with less guard band noise can be provided.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A control circuit for controlling the position of the heads in a magnetic reproducing apparatus of the kind having a plurality of rotary magnetic heads mounted on respective electromechanical transducer elements, said magnetic heads being displaceable in the transverse direction relative to the recorded tracks on a magnetic tape in response to control voltages applied to said respective transducer elements to effect correct scanning of said tracks by said heads and a pulse generator for generating a first pulse signal of a frequency dependent on a transport speed of said tape, said control circuit comprising:
   a first counter for counting the pulses of said first pulse signal to produce a first count output each time one of said heads completes scanning of a track;
   a second counter for adding to said first count output the number of pulses of a second pulse signal having a frequency which is an integral multiple of said frequency of said first pulse signal to produce a second count output;
   a third counter responsive to the speed of said rotary heads and connected to count the pulses of said first pulse signal to produce a third count output upon each scan of a track by a head;
   difference means connected to said third count output for producing a difference output representing the difference in count between successive ones of said third count outputs;
   means for combining said difference output and said second count output for producing a summed signal; and
   means responsive to the speed of said rotary heads for deriving control signals from said summed signal and said second count output fed to said transducer elements to preset the positions of said heads relative to said tracks before each head is to start scanning a respective track.

2. A circuit according to claim 1 wherein said means for producing a difference output comprises a pair of latch circuits connected in cascade to the output of said third counter, and a subtrater for forming the difference of respective said third count outputs held in said latch circuits.

3. A circuit according to claim 1 wherein said means to for combining said difference output with said second count output is an adder.

4. A circuit according to claim 3 wherein the output of said adder is supplied to a digital-to-analog converter the output of which is supplied to respective sample-holding circuits responsive to the speed of rotation of said heads for producing respective control voltages for the respective said heads.

5. A circuit according to claim 1 wherein said transducer elements are bimorph leaves.

6. A circuit according to claim 1, in which said second pulse signal is produced by a frequency doubler means connected to said first pulse signal, whereby the frequency of said second pulse signal is two times the frequency of said first pulse signal.

7. A circuit according to claim 1, in which said means for deriving control signals fed to said transducer elements comprises a digital-to-analog convertor connected to said second count output for producing an analog signal, and first and second sample-holding circuits connected to said analog signal and each being responsive to the speed of said rotary heads for producing respective control signals fed to said electromechanical transducer elements.

8. A circuit according to claim 7, further comprising first and second time delay means connected to receive respective head-speed signals representative of the speed of said rotary heads and for imparting a time delay thereto and said time-delayed head-speed signals being fed to said first and second sample-holding circuits, respectively.

* * * * *

UNITED STATES PATENT AND TRADEMARK OFFICE
CERTIFICATE OF CORRECTION

PATENT NO. : 4,825,311                  Page 1 of 2

DATED : April 25, 1989

INVENTOR(S) : Isao Saito

It is certified that error appears in the above-identified patent and that said Letters Patent is hereby corrected as shown below:

Col. 2, line 9, after "; and" start new paragraph.

line 62, change "11b" to --11b--

Col. 3, line 7, change "suplied" to --supplied--

Col. 5, line 24, change "and" to --to-- line 36, delete "as"

Col. 6, line 20, change "frequeny" to --frequency-- line 26, change "depended" to --dependence-- line 48, change "circuit" to --circuits--

Col. 8, lines 15 & 16, "by sampling the signal" should not be in italics.

Col. 9, line 40, change "i" to --is-- same line, before "gradually" insert --increased"

UNITED STATES PATENT AND TRADEMARK OFFICE
CERTIFICATE OF CORRECTION

PATENT NO. : 4,825,311

DATED : April 25, 1989

INVENTOR(S) : Isao Saito

It is certified that error appears in the above-identified patent and that said Letters Patent is hereby corrected as shown below:

Column 10, line 53, "subtrater" to -- subtractor --.

Signed and Sealed this

Thirtieth Day of January, 1990

*Attest:*

JEFFREY M. SAMUELS

*Attesting Officer*     *Acting Commissioner of Patents and Trademarks*